United States Patent
Georgescu et al.

(10) Patent No.: US 7,970,191 B2
(45) Date of Patent: Jun. 28, 2011

(54) SYSTEM AND METHOD FOR SIMULTANEOUSLY SUBSAMPLING FLUOROSCOPIC IMAGES AND ENHANCING GUIDEWIRE VISIBILITY

(75) Inventors: Bogdan Georgescu, Plainsboro, NJ (US); Peter Durlak, Erlangen (DE); Vassilis Athitsos, Arlington, TX (US); Adrian Barbu, Tallahassee, FL (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 945 days.

(21) Appl. No.: 11/860,591

(22) Filed: Sep. 25, 2007

(65) Prior Publication Data

US 2008/0107314 A1    May 8, 2008

Related U.S. Application Data

(60) Provisional application No. 60/827,240, filed on Sep. 28, 2006.

(51) Int. Cl.
*G06K 9/00* (2006.01)
*G06K 9/40* (2006.01)

(52) U.S. Cl. ........................................ 382/128; 382/263

(58) Field of Classification Search .................. 382/128, 382/263
See application file for complete search history.

(56) References Cited

U.S. PATENT DOCUMENTS

| | | | | |
|---|---|---|---|---|
| 5,526,446 A * | 6/1996 | Adelson et al. | ................ | 382/275 |
| 5,768,405 A * | 6/1998 | Makram-Ebeid | ............. | 382/128 |
| 5,799,100 A * | 8/1998 | Clarke et al. | ................. | 382/132 |
| 5,828,769 A * | 10/1998 | Burns | ........................... | 382/118 |
| 6,731,806 B1 * | 5/2004 | Gindele | ....................... | 382/205 |
| 6,895,077 B2 * | 5/2005 | Karellas et al. | .............. | 378/98.3 |
| 6,937,776 B2 * | 8/2005 | Li et al. | .......................... | 382/260 |
| 7,408,683 B2 * | 8/2008 | Sato et al. | ..................... | 358/474 |
| 7,463,773 B2 * | 12/2008 | Lee et al. | ...................... | 382/218 |
| 2005/0074158 A1 * | 4/2005 | Kaufhold et al. | ............. | 382/132 |
| 2006/0039590 A1 * | 2/2006 | Lachine et al. | ............... | 382/128 |
| 2007/0147682 A1 * | 6/2007 | Chang et al. | .................. | 382/190 |

OTHER PUBLICATIONS

"Orientation Selective Operators for Ridge, Valley, Edge, and Line Detection in Imagery", Jianxin Hou et al., 1994 IEEE International Conference on Acoustics, Speech, and Signal Processing, 1994. ICASSP-94, vol. 5, pp. 25-28.*

Freeman, William T., et al., "The Design and Use of Steerable Filters," *IEEE Transactions on Pattern Analysis and Machine Intelligence*, (1991) 13:9.

* cited by examiner

*Primary Examiner* — Wenpeng Chen

(57) ABSTRACT

A method for downsampling fluoroscopic images and enhancing guidewire visibility during coronary angioplasty includes providing a first digitized image, filtering the image with one or more steerable filters of different angular orientations, assigning a weight W and orientation O for each pixel based on the filter response for each pixel, wherein each pixel weight is assigned to a function of a maximum filter response magnitude and the pixel orientation is calculated from the angle producing the maximum filter response if the magnitude is greater than zero, wherein guidewire pixels have a higher weight than non-guidewire pixels, and downsampling the orientation and weights to calculate a second image of half the resolution of the first image, wherein the downsampling accounts for the orientation and higher weight assigned to the guidewire pixels.

24 Claims, 5 Drawing Sheets

SYSTEM AND METHOD FOR SIMULTANEOUSLY SUBSAMPLING FLUOROSCOPIC IMAGES AND ENHANCING GUIDEWIRE VISIBILITY

CROSS REFERENCE TO RELATED UNITED STATES APPLICATIONS

This application claims priority from "A Method for Simultaneously Subsampling Fluoroscopic Images and Enhancing Guidewire Visibility", U.S. Provisional Application No. 60/827,240 of Athitsos, et al., filed Sep. 28, 2006, the contents of which are herein incorporated by reference.

TECHNICAL FIELD

This disclosure is directed to detecting and tracking the guidewire in coronary angioplasty.

DISCUSSION OF THE RELATED ART

Coronary angioplasty is a medical procedure used to restore blood flow through clogged coronary arteries. During that procedure, a catheter is inserted through an artery in the thigh, and guided by a physician until it reaches the location of obstruction. Then, a guidewire is inserted inside the catheter through and beyond the obstruction. Over the guidewire, a catheter with a deflated balloon is inserted and guided so that the balloon reaches the blockage. At that point, the balloon is inflated and deflated several times so as to unblock the artery. A device called a stent is often placed at that position in order to keep the artery from becoming clogged again.

Throughout this procedure, the physician uses fluoroscopic images in order to monitor the position of the catheter, the guidewire, the balloon, and the stent. Fluoroscopic images are X-ray images collected at a rate of several frames per second. In order to reduce the patient's exposure to X-ray radiation, the X-ray dosage is kept low and as a result the images tend to have low contrast and include a large amount of noise. An example of a fluoroscopy system in operation is shown in FIG. 1, with a patient 11 shown on an operating table 12 with fluoroscopic camera 13 and display monitors 14. FIG. 2 presents some example images acquired using such a system. A guidewire 21 is indicated for the lower image in the figure. As can be seen in FIG. 2, it is often challenging to distinguish the objects of interest, in particular the catheter and guidewire, in such images. Tuning acquisition parameters so as to optimize the visibility of the guidewire can help physicians navigate the wire and stent through the arterial system during intervention, while minimizing the exposure of the patient to X-ray radiation. In addition, improving the visibility of the guidewire can make it easier to automatically detect the catheter and guidewire using specialized software.

Performing exhaustive search for guidewire detection and tracking in fluoroscopic images can be performed significantly faster in half-resolution or quarter-resolution. However, the guidewire is a very thin structure (typically about 2-3 pixels wide) even in the full-resolution images. Straightforward subsampling methods essentially blend guidewire pixels with the background, thus rendering the guidewire barely, if at all, visible in the downsampled images. As a result, detecting and tracking the guidewire in reduced resolution can become extremely challenging or even infeasible.

SUMMARY OF THE INVENTION

Exemplary embodiments of the invention as described herein generally include methods and systems for reducing the resolution of fluoroscopic images while enhancing the visibility of the guidewire in the downsampled images. By assigning weights to pixels of the full-resolution in a non-uniform way, guidewire pixels are likely to receive much higher weights than non-wire pixels in the same neighborhood. A method according to an embodiment of the invention can facilitate the tasks of detection and tracking on the reduced-resolution images, and thus allows pyramid-based detection/tracking methods to be applied to the full-resolution fluoroscopic images, where results can be obtained significantly faster than in full resolution. Results on 53 fluoroscopic sequences demonstrate that a method according to an embodiment of the invention can significantly outperform the standard uniform-weight subsampling method, in terms of preserving guidewire visibility.

According to an aspect of the invention, there is provided a method for downsampling fluoroscopic images and enhancing guidewire visibility during coronary angioplasty, the method including providing an first digitized image comprising an array of intensities corresponding to a 2-dimensional grid of pixels, filtering the image with one or more steerable filters of different angular orientations, assigning a weight W and orientation O for each pixel based on the filter response for each pixel, wherein each pixel weight is assigned to a function of a maximum filter response magnitude and the pixel orientation is calculated from the angle producing the maximum filter response if the magnitude is greater than zero, wherein guidewire pixels have a higher weight than non-guidewire pixels, and downsampling the orientation and weights to calculate a second image of half the resolution of the first image, wherein the downsampling accounts for the orientation and higher weight assigned to the guidewire pixels.

According to a further aspect of the invention, the first digitized image is acquired during a coronary angioplasty procedure.

According to a further aspect of the invention, the pixel weight and orientation are assigned to zero if the maximum filter response is less than or equal to zero.

According to a further aspect of the invention, the pixel orientation is assigned to a 2×2 tensor that is an outer product of a direction vector oriented normal to the angle producing the maximum filter response magnitude.

According to a further aspect of the invention, downsampling the orientation and weights comprises calculating an average of the orientation of each pixel and the weight of each pixel over a neighborhood of pixels about each pixel to calculate a next level weight for the pixel, and calculating the second image from a subset of pixels in the first image by weighting the first image pixels by the next level weights.

According to a further aspect of the invention, the neighborhood of pixels comprises a 3×3 neighborhood centered about each pixel weighted according to the matrix $$N = \begin{bmatrix} 0.0625 & 0.1250 & 0.0625 \\ 0.1250 & 0.2500 & 0.1250 \\ 0.0625 & 0.1250 & 0.0625 \end{bmatrix},$$

wherein the average orientation O' of pixel p is $$O'(p) = \frac{\sum_{i \in 3 \times 3 nbh(p)} W_i(p) N_i(p) O_i(p)}{\sum_{i \in 3 \times 3 nbh(p)} W_i(p) N_i(p)},$$

wherein the sum is over the 3×3 neighbor of pixel p.

According to a further aspect of the invention, the average weight W' of pixel p is $$W'(p) = \frac{1}{9} \sum_{i \in 3 \times 3nbh(p)} w_i,$$

wherein $$w_i(p) = N_i(p) + W_i(p) + |\hat{o}_i(p) \cdot \hat{o}'_i(p)|,$$

wherein $\hat{o}$ is a unit orientation vector calculated from $O_i$ and $\hat{o}'$ is a unit orientation vector calculated from O.

According to a further aspect of the invention, the intensity of a pixel p in the second image I' is $$I'(p) = \frac{\sum_{i \in 3 \times 3nbh(p)} w_i(p) \cdot I_i(p)}{\sum_{i \in 3 \times 3nbh(p)} w_i(p)}$$

wherein the sum is over the 3×3 neighborhood from the first image I that corresponds to p.

According to a further aspect of the invention, the method includes selecting a set of pixels on the guidewire, selecting a set of background pixels in a neighborhood of the guidewire that do not include the guidewire pixels, calculating a mean intensity $\mu_N$, $\mu_B$, and intensity variance $\sigma_N$, $\sigma_B$ for both the guidewire pixels and the background pixels, respectively, calculating s distance measure $d^2$ between the 2 sets of pixels as $$d^2(w) = \frac{1}{4}(\sigma_N - \sigma_B)^2(\sigma_N + \sigma_B)^{-1} + \frac{1}{2}\log\frac{\frac{1}{2}(\sigma_N + \sigma_B)}{\sqrt{\sigma_N \sigma_B}},$$

wherein w represents the guidewire pixels, and calculating a visibility V of the guidewire from $$V = \frac{1}{n}\sum_{i=1}^{n} d^2(w_i),$$

wherein the sum is over the guidewire pixels.

According to another aspect of the invention, there is provided a program storage device readable by a computer, tangibly embodying a program of instructions executable by the computer to perform the method steps for downsampling fluoroscopic images and enhancing guidewire visibility during coronary angioplasty.

DETAILED DESCRIPTION OF EXEMPLARY EMBODIMENTS

Figure 2:
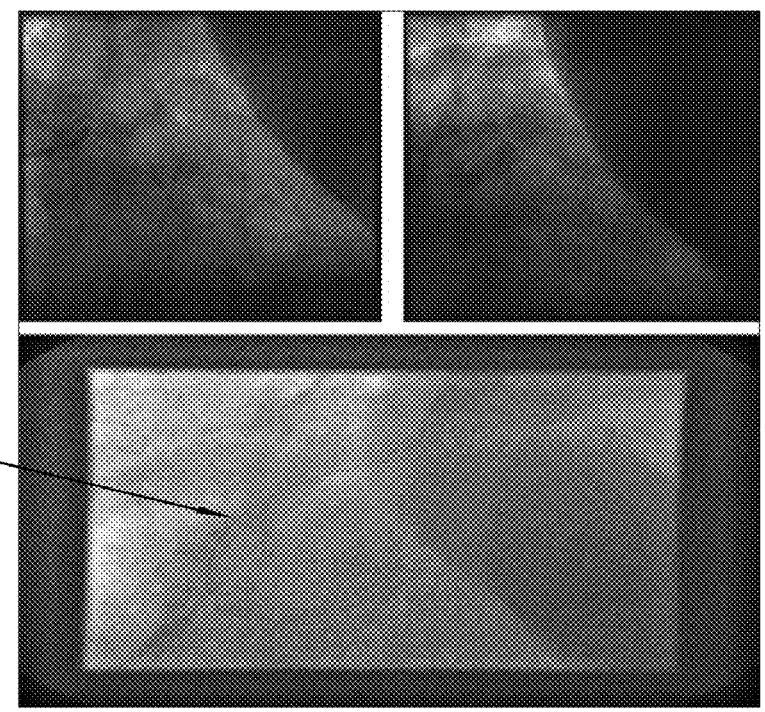
FIG. 2 presents some example images acquired using an exemplary fluoroscopy system, according to an embodiment of the invention.
Figure 1:
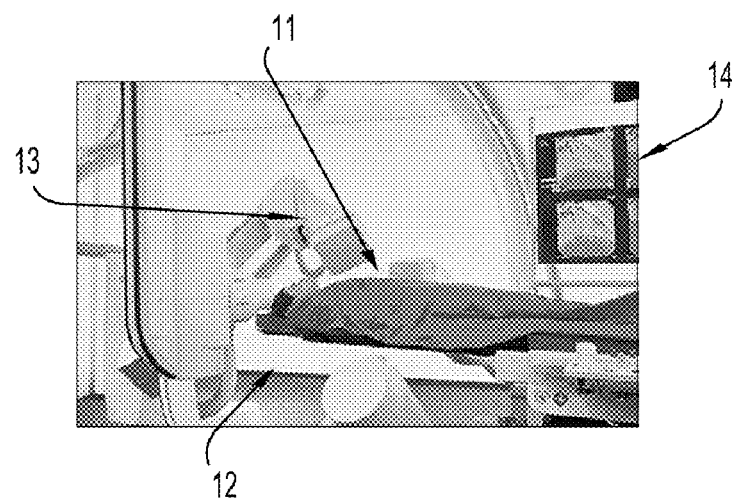
FIG. 1 depicts an exemplary fluoroscopy system in operation, according to an embodiment of the invention.

Exemplary embodiments of the invention as described herein generally include systems and methods for detecting and tracking the guidewire in coronary angioplasty. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from none medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 3:
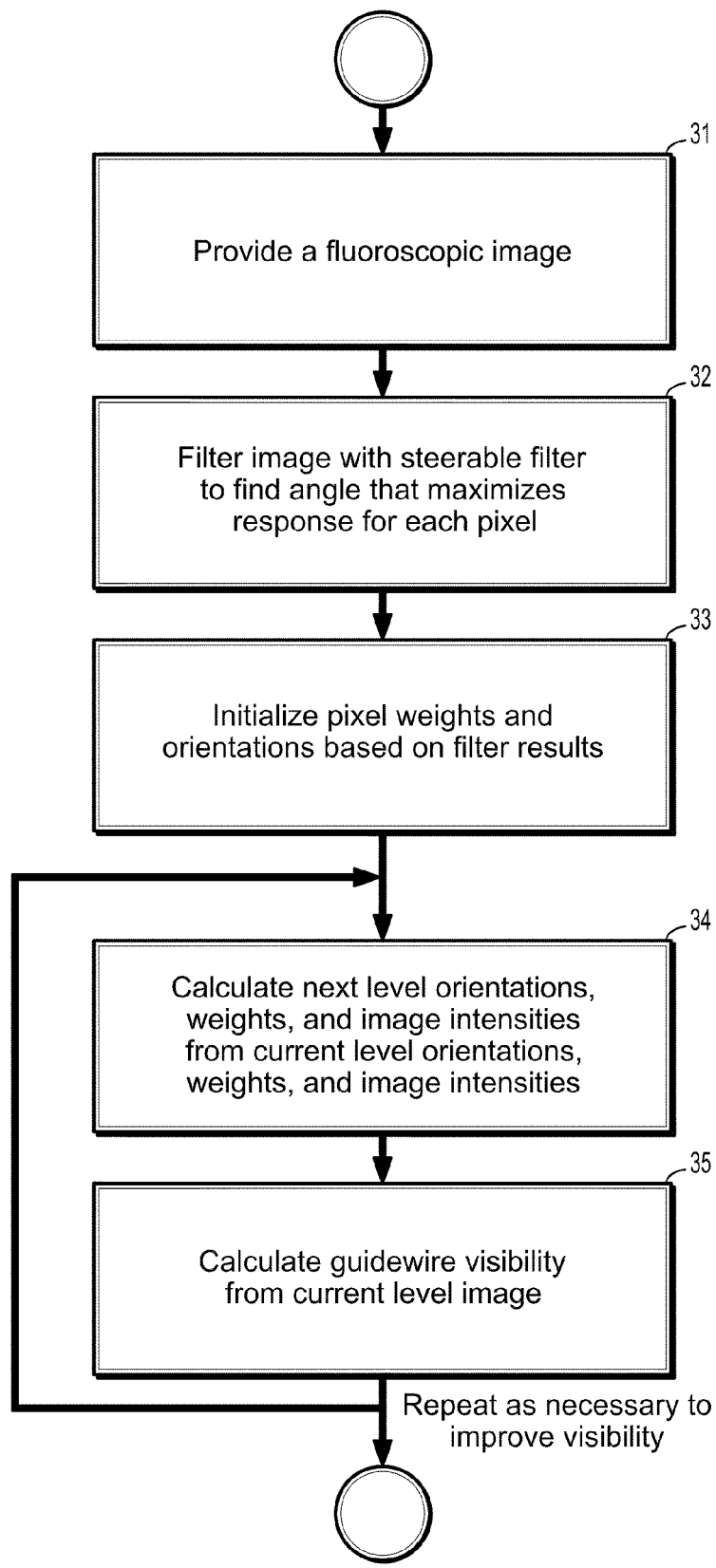
FIG. 3 is a flow chart of a method for detecting and tracking the guidewire in coronary angioplasty, according to an embodiment of the invention.

A flow chart of a method for detecting and tracking the guidewire in coronary angioplasty is depicted in FIG. 3. The input to an algorithm according to an embodiment of the invention, provided at step 31, is a single frame of a fluoroscopic video sequence. It is desired first to produce a downsampled version of the input frame, where it is faster to perform detection and tracking operations that involve exhaustive search, and second, to make the guidewire as visible as possible in the downsampled images, so that the detection and tracking algorithms can detect the guidewire as accurately as possible.

When a half-resolution image (half the width and half the height of the original image) is produced, each pixel on the half-resolution image depends on a 2×2 or 3×3 region of the original, full-resolution, image. Straightforward subsampling gives the same weight to each pixel of the original image. In an algorithm according to an embodiment of the invention, guidewire pixels should be given more weight. In the full-resolution image, a guidewire pixel is typically darker than non-guidewire pixels in its neighborhood, and it is desired to preserve that property as much as possible in the down-sampled image. This can be achieved by assigning weights to pixels in a non-uniform way, so that guidewire pixels tend to receive higher weights than non-wire pixels in the neighborhood.

A first step is to assign weights to pixels in a way that favors guidewire pixels. A small guidewire piece can be approximated as a thin straight line that is darker than its background.

A simple filter that gives high responses on horizontal parts of the guidewire is the x derivative-of-Gaussian. To detect other orientations of the wire one simply needs to apply the directional derivative-of-Gaussian, so that the direction of the derivative matches the orientation of the wire.

The directional derivative-of-Gaussian is a steerable filter. A steerable filter is an angularly oriented filter that can be constructed from a linear combinations of basis filters. By varying the expansion coefficients of the basis functions, one can adaptively steer such a filter to any orientation. As an example, consider a 2-dimensional Gaussian, $G(x, y)=\exp(-(x^2+y^2))$. Denoting the $n^{th}$ derivative of a Gaussian in the x-direction by $G_n$ and a function rotated by an angle $\theta$ by $f^\theta(x,y)$, the $1^{st}$ x-derivative of a Gaussian is $$G_1^0 = \frac{\partial}{\partial x}\exp(-(x^2+y^2)) = -2x\exp(-(x^2+y^2)).$$

The same function rotated by 90 degrees is $$G_1^{90} = \frac{\partial}{\partial y}\exp(-(x^2+y^2)) = -2y\exp(-(x^2+y^2)).$$

A $G_1$ filter in an arbitrary orientation $\theta$ can be constructed from a linear combination of $G_1^0$ and $G_1^{90}$:

$$G_1^\theta = \cos(\theta)G_1^0 + \sin(\theta)G_1^{90}.$$

Since $G_1^0$ and $G_1^{90}$ span the set of $G_1^\theta$ filters, they from a basis set for $G_1^\theta$. The $\cos(\theta)$ and $\sin(\theta)$ terms are the corresponding interpolation functions for those basis filters. One can synthesize an image filtered at an arbitrary orientation by taking linear combinations of the image filtered with $G_1^0$ and $G_1^{90}$. If $$R_1^0 = G_1^0 \circ I,$$

$$R_1^{90} = G_1^{90} \circ I,$$

then $$R_1^\theta = \cos(\theta)R_1^0 + \sin(\theta)R_t^{90},$$

where I is the image and $\circ$ is the convolution operator.

More generally, a steerable function can be represented as $$f^\theta(x, y) = \sum_{j=1}^{M} k_j(\theta)f^{\theta_j}(x, y).$$

Any function that can be represented as either a Fourier series in angle or as a polynomial expansion in x and y times a radially symmetric window function is steerable. In addition, any function that is bandlimited in angular frequency is steerable. The interpolation functions $k_j(\theta)$ are solutions of:

$$\begin{pmatrix} 1 \\ e^{i\theta} \\ \vdots \\ e^{iN\theta} \end{pmatrix} = \begin{pmatrix} 1 & 1 & \cdots & 1 \\ e^{i\theta_1} & e^{i\theta_2} & \cdots & e^{i\theta_M} \\ \vdots & \vdots & & \vdots \\ e^{iN\theta_1} & e^{iN\theta_2} & \cdots & e^{iN\theta_M} \end{pmatrix} \begin{pmatrix} k_1(\theta) \\ k_2(\theta) \\ \vdots \\ k_M(\theta) \end{pmatrix}.$$

The minimum number of basis functions sufficient to steer a function $f(r,\phi)$ is at least the number of nonzero coefficients in the angular Fourier expansion of $f$. For a function represented by a polynomial expansion in x and y times a radially symmetric window function, the minimum number of basis functions is 1 plus the order of the polynomial.

For a function $f$ that can be written as a polynomial in x and y, there is an x-y separable basis:

$$f^\theta(x, y) = \sum_l \sum_j k_{lj}(\theta)x^l y^j,$$

where each x and y product in the rotated polynomial can be thought of as an x-y separable basis function with the coefficient $k_{lj}(\theta)$ being the interpolation function.

For the case of even or odd parity filters $f^\theta(x,y)$, which can be written as $$f^\theta(x,y) = G(r)Q_N(x')$$

where $G(r)$ is a Gaussian and $Q_N(x')$ is an $n^{th}$ order polynomial in $x'=x\cos(\theta)-y\sin(\theta)$, if there is a basis set of N+1 separable filters, then there is a set of separable basis functions $R_j(x)S_j(y)$ such that $$f^\theta(x, y) = G(r)\sum_{j=0}^{N} k_j(\theta)R_j(x)S_j(y).$$

The basis functions satisfy $$R_j(x)S_j(y) = c(xN-j+\ldots)(y^j+\ldots),$$

where c is a constant, and the interpolating functions $k_j(\theta)$ can be found from $$k_j(\theta) = (-1)^j \binom{N}{j} \cos^{N-j}(\theta)\sin^j(\theta).$$

The fact that directional derivative-of-Gaussian is a steerable filter means that one can compute for each image pixel the direction that maximizes a filter response without having to exhaustively try all possible directions. Actually, computing the responses for three directions suffices for computing, for each pixel, the maximum response and the direction that maximizes the response. A separable basis set for a $2^{nd}$ derivative Gaussian can be used for this filter, where $$G_2^\theta = k_a(\theta)G_{2a} + k_b(\theta)G_{2b} + k_c(\theta)G_{2c},$$

with $$G_{2a} = 0.9213(2x^2-1)\exp(-(x^2+y^2))$$

$$G_{2b} = 1.843xy\exp(-(x^2+y^2)),$$

$$G_{2c} = 0.9213(2y^2-1)\exp(-(x^2+y^2))$$

and $$k_a(\theta) = \cos^2(\theta)$$

$$k_b(\theta) = -2\cos(\theta)\sin(\theta).$$

$$k_c(\theta) = \sin^2(\theta)$$

If a continuous function is steerable, then a sampled version is also steerable in the same way. One can thus obtain digital steerable filters by sampling a continuous filter. The 3 filters, $G_{2a}$, $G_{2b}$, $G_{2c}$, can be written as a product of sample functions as $$G_{2a}=F1(x)F2(y),$$

$$G_{2b}=F3(x)F3(y),$$

$$G_{2c}=F2(x)F1(y),$$

using 9 samples with a sample spacing of 0.35. Table 1 following, shows the F1, F2, and F3 filters that correspond to a spacing of 0.35.

TABLE 1

| Tap # | F1 | F2 | F3 |
|---|---|---|---|
| −4 | 0.3789 | 0.1409 | −0.2677 |
| −3 | 0.3686 | 0.3320 | −0.4733 |
| −2 | −0.0113 | 0.6126 | −0.5822 |
| −1 | −0.6154 | 0.8847 | −0.4204 |
| 0 | −0.9213 | 1.0000 | 0.0000 |
| 1 | −0.6154 | 0.8847 | 0.4204 |
| 2 | −0.0113 | 0.6126 | 0.5822 |
| 3 | 0.3686 | 0.3320 | 0.4733 |
| 4 | 0.3789 | 0.1409 | 0.2677 |

Using these $2^{nd}$ derivative Gaussian filters, the image can be filtered at step 32 by $$R_{2a}=G_{2a}\circ I$$

$$R_{2b}=G_{2b}\circ I,$$

$$R_{2c}=G_{2c}\circ I$$

with the filtered image for an angle $\theta$ being $$R_2^\theta=\cos^2(\theta)R_2a-2\sin(\theta)\cos(\theta)R_2b+\sin^2(\theta)R_2c.$$

By using these filters, one can obtain, at step 33, for the full-resolution image I, a map of magnitudes M, that holds the maximum response for each pixel, and a map of orientations O, that holds the orientation (from 0 to 180 degrees) yielding the maximum response. A peak non-zero pixel response magnitude for a given angle is indicative of the presence of a guidewire oriented at the given angle. The magnitudes map is used at step 33 to assign an initial weight to each pixel of the full-resolution image. If the corresponding entry in the magnitude map is negative or zero, then the weight of the pixel is set to 0. If the corresponding magnitude is m>0, then the weight is set to a function of m. An exemplary, non-limiting function is $m^2$. The symbol W is used for the map of pixel weights obtained this way.

Once an initial weight has been assigned to each pixel, those weights can be used at step 34 to generate half-resolution versions of I, W and O, i.e., the original image, the weight map, and the orientation map. Overall, to go from one resolution level to the next, the input is the pixel intensities, weights and orientation at the current level and the output is the pixel intensities, weights and orientations at the next level. While the weights and orientations for the full resolution are obtained using steerable filtering, as previously described, the weights and orientation at all other pyramid levels are nor computed using steerable filtering; they are themselves subsampled versions of the weights and orientations computed at the full-resolution level. The symbols I, W, O will used herein below to denote the intensities, weights and orientations at the current level, which are used as input, and I', W', O' will denote the intensities, weights and orientations at the next level, which are the output of a method according to an embodiment of the invention.

According to an embodiment of the invention, each pixel at the next pyramid level corresponds to a 3×3 neighborhood at the current pyramid level. The pixels of that 3×3 neighborhood can be weighted using, the following neighborhood weight matrix N.

$$N = \begin{bmatrix} 0.0625 & 0.1250 & 0.0625 \\ 0.1250 & 0.2500 & 0.1250 \\ 0.0625 & 0.1250 & 0.0625 \end{bmatrix}.$$

This 3×3 neighborhood is exemplary and non-limiting, and other 3×3 weighting matrices, and different size neighborhoods, such as a 2×2 neighborhood, can be similarly defined in other embodiments of the invention.

In computing the values of I', W', and O' for a particular pixel p at the next level, a first step is to compute an average orientation for that pixel, using information at the current level. For the purposes of averaging orientations, the orientation for each pixel is represented as a tensor, i.e., as a 2×2 matrix. For an orientation q, the 2×2 tensor is:

$$O(p) = \begin{bmatrix} \cos^2 q & \cos q \sin q \\ \cos q \sin q & \cos^2 q \end{bmatrix}.$$

This orientation tensor is the outer product of the direction vector $\hat{o}=[\cos(q), \sin(q)]$ for the pixel, where the direction vector corresponds to the angle of maximum filter response for that pixel. This representation allows for an easy combination of several directions for averaging orientations. The direction vector is also the unit orientation vector of the pixel. Note that if there is no angle that maximizes the filter response, i.e., the weight has been set to zero, then the orientation tensor is also set to zero.

Using tensors, the tensor representing the average orientation over the 3×3 neighborhood of a pixel is the weighted average of the 9 orientation tensors from the pixels of that neighborhood:

$$O'(p) = \frac{\sum_{i \in 3 \times 3 nbh(p)} W_i(p) N_i(p) O_i(p)}{\sum_{i \in 3 \times 3 nbh(p)} W_i(p) N_i(p)},$$

where the sum is over the 3×3 neighbor of pixel p.

The next level weight for each pixel the product of the neighborhood weight (obtained from matrix N) and current level weights of pixels in the 3×3 neighborhood about the pixel (obtained from matrix W). The weight of every pixel in this 3×3 neighborhood is a factor of three terms:

1. The neighborhood weight of the pixel, obtained from matrix N;
2. The current level weight of the pixel, obtained from matrix W;
3. The absolute value of the dot product between the unit vector of the orientation of the pixel (obtained from O) and the unit vector of the average orientation of the neighborhood that we have already computed and denoted as q(p).

The next level weight can be expressed as:

$$W'(p) = \frac{1}{9} \sum_{i \in 3 \times 3nbh(p)} w_i,$$

where $$w_i(p) = N_i(p) + W_i(p) + |\hat{o}_i(p) \cdot \hat{o}'_i(p)|,$$

where ô is the unit orientation vector extracted from $O_i$ and ô' is the unit orientation vector extracted from $O_i'$.

Now one can compute the intensity value for p, and the weight of p, i.e., the entries for pixel p in matrices I' and W'. The intensity of p can be computed from the weighted average of the intensities in the 3×3 neighborhood from the current level that corresponds to p:

$$I'(p) = \frac{\sum_{i \in 3 \times 3nbh(p)} w_i(p) \cdot I_i(p)}{\sum_{i \in 3 \times 3nbh(p)} w_i(p)}.$$

For numerical stability, if the sum of these weights in the 3×3 neighborhood is less than 0.001, the intensity of p in I' is set to the unweighted average of the intensities in the neighborhood. In this case the weight of pixel p in W' is simply the sum of the weights assigned to the pixels in the 3×3 neighborhood.

At step 35, the visibility of the guidewire in the downsampled image I' is calculated. Intuitively, for the wire to be visible, wire pixels should be darker than their adjacent background pixels. Given an individual guidewire pixel w, its visibility can be measured using the Bhattacharyya distance between the distribution of intensities in wire pixels close to w and the distribution of intensities in background pixels close to w. Let N(w) be the wire pixels close to w, and B(w) be the background pixels close to w. Assuming that the intensities of pixels in N(w) and B(w) follow a normal distribution, let $\mu_N$, $\sigma_N$ be the mean and variance for the intensity values in N(w) and $\mu_B$, $\sigma_B$ be the mean and variance for the intensity values in B(w). Then, the Bhattacharyya distance $d^2(w)$ between the two distributions around pixel w is defined as:

$$d^2(w) = \frac{1}{4}(\mu_N - \mu_B)^2 (\sigma_N + \sigma_B)^{-1} + \frac{1}{2} \log \frac{\frac{1}{2}(\sigma_N + \sigma_B)}{\sqrt{\sigma_N \sigma_B}}.$$

The visibility of the entire guidewire, $V(I, (w_1, \ldots, w_n))$, is defined as the average of the $d^2(w)$ values for wire pixels:

$$V(I, (w_i, \ldots, w_n)) = \frac{1}{n} \sum_{i=1}^{n} d^2(w_i).$$

This visibility measure is disclosed in these inventors' patent application, "System and Method for Online Optimization of Guidewire Visibility in AX Fluoroscopic Systems", U.S. patent application Ser. No. 11/860,588 of Barbu, et al., filed on Sep. 25, 2007, the contents of which are herein incorporated by reference in their entirety.

According to an embodiment of the invention, an exemplary, non-limiting N(w) is defined as follows: take, along the wire curve, a curve segment that is 21 pixels long such that the center pixel (the $11^{th}$ pixel) is w. The set N(w) comprises those 21 pixels. The set B(w) of background pixels is constructed as follows: For each pixel p' along that curve, include in B(w) the two pixels that, when the curve is oriented to be horizontal at p', are above and below p, and at distance of 2 pixels from p'. When the curve orientation at p' is not horizontal, the coordinates of those two pixels are not integer coordinates. In that case, the intensity at those pixels is computed using bilinear interpolation. Note that the numeric values for the curve segment length and the width of the background are illustrative, and other values can be used as necessary to define the sets N(w) and B(w) according to other embodiments of the invention.

The steps of downsampling, step 34, and of calculating the guidewire visibility, step 35, can be repeated as necessary to improve the guidewire visibility.

Figure 4:
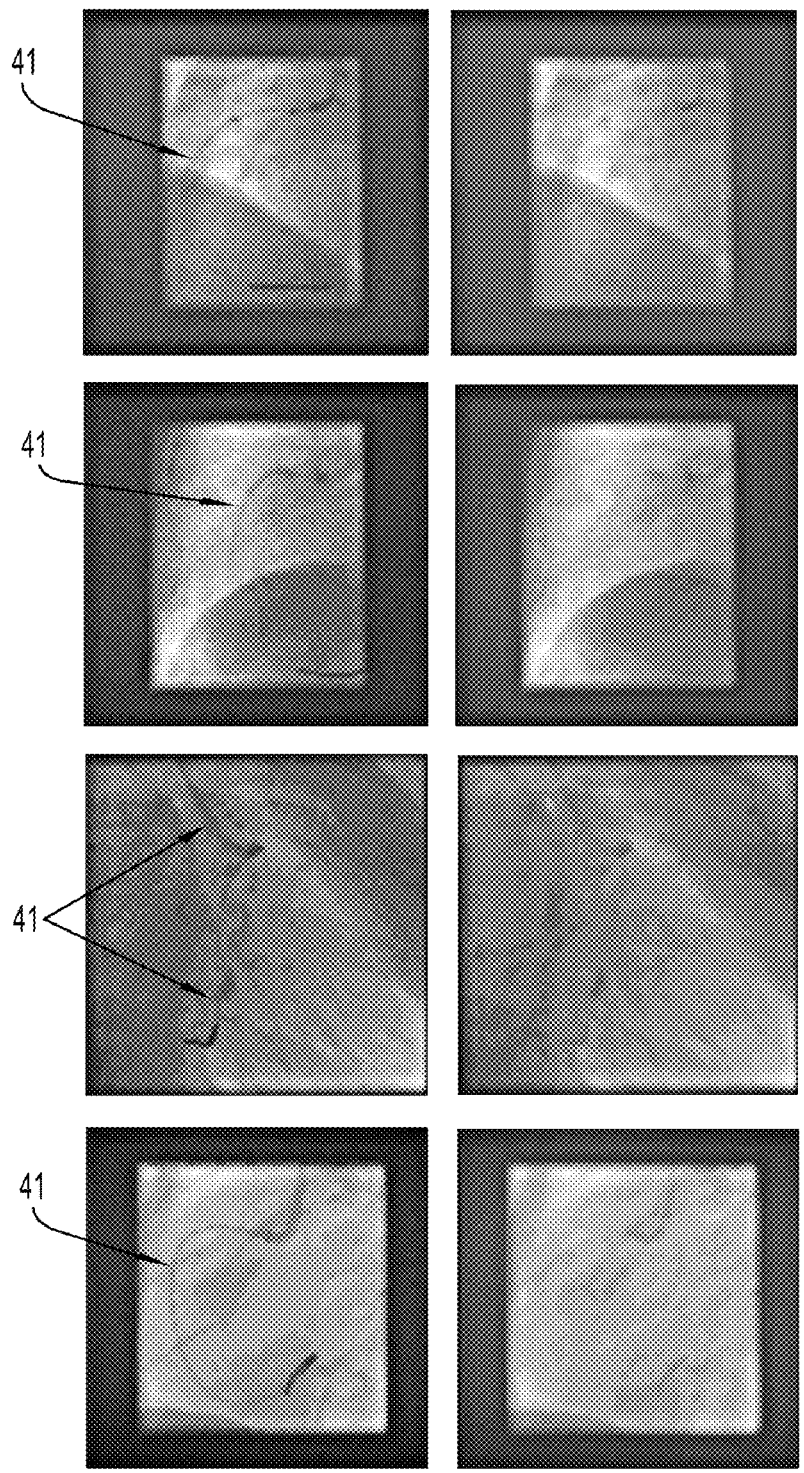
FIGS. 4 and 5 depict some examples of quarter-resolution versions of fluoroscopic images, according to an embodiment of the invention.
Figure 5:
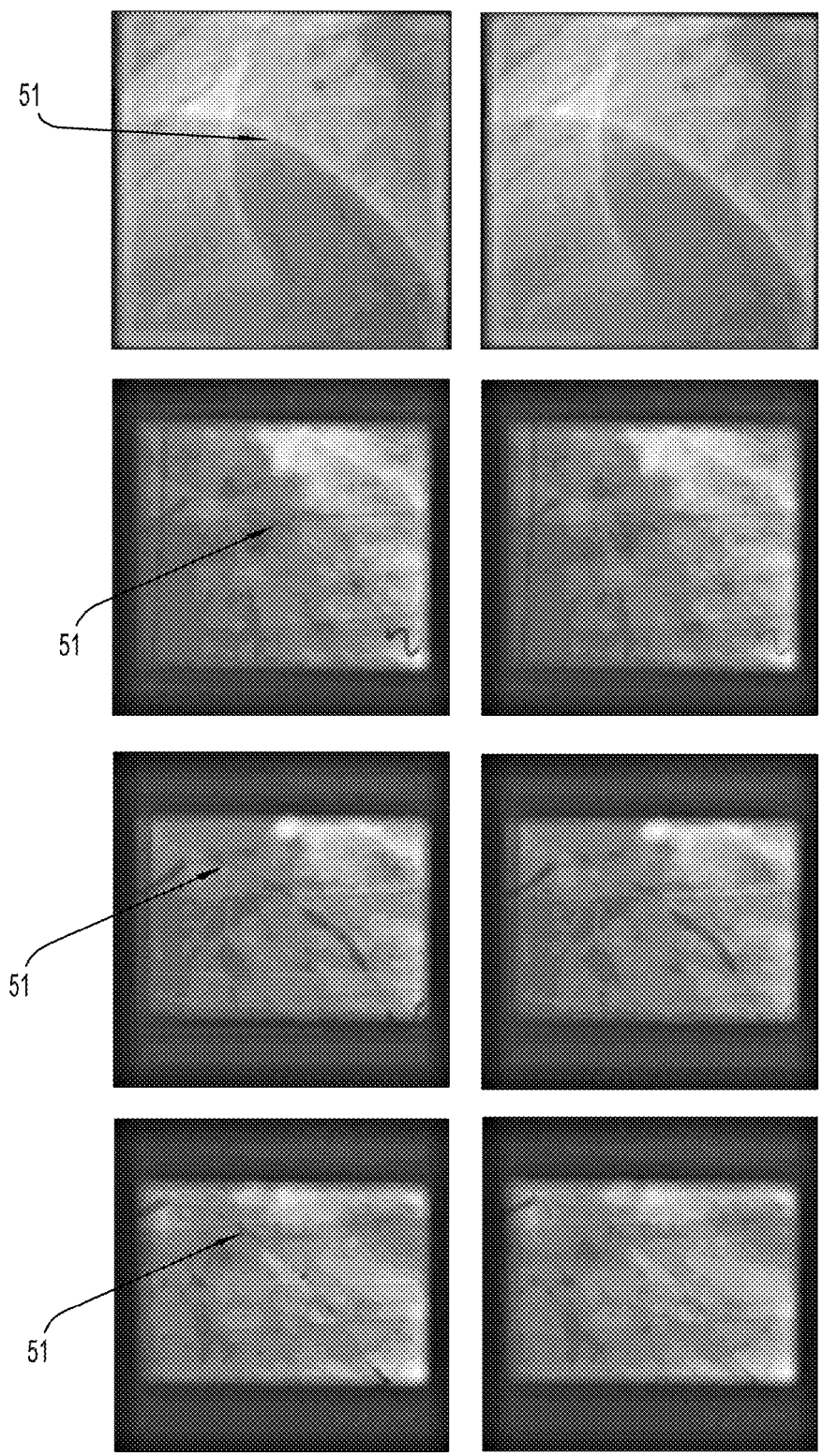

A method according to an embodiment of the invention has been applied to 53 fluoroscopic video sequences displaying a guidewire. Each frame of each sequence was normalized so that intensity values range between 0 and 1. Using a method according to an embodiment of the invention, each sequence was reduced to quarter-resolution, i.e., one quarter of the width and one quarter of the height of the original sequence. For each frame of each sequence the visibility of the guidewire was measured using the Bhattacharya-based measure. This way the average visibility of the guidewire for each sequence was computed. The overall performance measure is the average visibility over all sequences. Table 2, presented below, shows the visibility measure all the 53 sequences and for images subsampled to quarter size using both a uniform weight method and using a method according to an embodiment of the invention. The left hand column displays the sequence name, the second column the visibility obtained from the original images, the third column the visibility obtained from a uniform weight method, and the right hand column the visibility obtained from a method according to an embodiment of the invention. Averages are displayed in the bottom row. The average obtained for these experiments is 0.3793. For comparison purposes, the average visibility over all sequences when standard subsampling is applied with uniform weights is 0.1880, worse than the result obtained with a method according to an embodiment of the invention. In 52 of the 53 sequences, a method according to an embodiment of the invention leads to higher average guidewire visibility than the method of subsampling with uniform weights. Further examples of quarter resolution versions of fluoroscopic images are presented in FIGS. 4 and 5. In each figure, images produced using a method according to an embodiment of the invention are displayed in the left column, and images produced using a uniform weight method are displayed in the right column. The guidewire is indicated for the left column images by reference number 41 in FIG. 4, and reference number 51 in FIG. 5.

TABLE 2

| Sequence name | Original | Uniform | Non-uniform method |
|---|---|---|---|
| ann_fluoro.vimseq1 | 0.2629 | 0.3094 | 0.3958 |
| ann_set4.vimseq1 | 0.1841 | 0.1303 | 0.1479 |
| ann_cropped0003.vimseq1 | 0.151 | 0.138 | 0.1631 |
| ann_cropped0005.vimseq1 | 0.1257 | 0.1364 | 0.1499 |
| ann_Fluoro_2_S10.avi | 0.3746 | 0.2022 | 0.3502 |
| ann_Fluoro_2_S11.avi | 0.337 | 0.1771 | 0.4097 |
| ann_Fluoro_2_S12.avi | 0.4333 | 0.2149 | 0.4433 |
| ann_Fluoro_2_S13.avi | 0.5748 | 0.2583 | 0.5361 |
| ann_Fluoro_2_S14.avi | 0.4331 | 0.115 | 0.2604 |

TABLE 2-continued

| Sequence name | Original | Uniform | Non-uniform method |
|---|---|---|---|
| ann_Fluoro_2_S15.avi | 0.3608 | 0.2024 | 0.3258 |
| ann_Fluoro_2_S16.avi | 0.16 | 0.0822 | 0.1545 |
| ann_Fluoro_2_S17.avi | 0.3091 | 0.1459 | 0.2626 |
| ann_Fluoro_2_S18.avi | 0.3374 | 0.3262 | 0.4457 |
| ann_Fluoro_2_S19.avi | 0.2157 | 0.2168 | 0.3989 |
| ann_Fluoro_2_S20.avi | 0.3184 | 0.1882 | 0.3169 |
| ann_Fluoro_2_S21.avi | 0.2343 | 0.2808 | 0.4115 |
| ann_Fluoro_2_S22.avi | 0.2841 | 0.2276 | 0.3162 |
| ann_Fluoro_2_S23.avi | 0 | 0.0109 | 0.0071 |
| ann_Fluoro_2_S24.avi | 0.3052 | 0.1845 | 0.2967 |
| ann_Fluoro_2_S25.avi | 0.1678 | 0.2403 | 0.3548 |
| ann_Fluoro_3_S11.avi | 0.2433 | 0.0935 | 0.2228 |
| ann_Fluoro_3_S12.avi | 0.9958 | 0.3128 | 1.0046 |
| ann_Fluoro_3_S13.avi | 0.6028 | 0.2017 | 0.6683 |
| ann_Fluoro_3_S14.avi | 0.8012 | 0.2019 | 0.7163 |
| ann_Fluoro_3_S16.avi | 0.7258 | 0.2857 | 0.7415 |
| ann_Fluoro_3_S17.avi | 0.3451 | 0.2157 | 0.3281 |
| ann_Fluoro_3_S19.avi | 1.0183 | 0.205 | 0.8461 |
| ann_Fluoro_3_S20.avi | 0.9176 | 0.4949 | 1.1629 |
| ann_Fluoro_3_S22.avi | 0.6459 | 0.2924 | 0.6073 |
| ann_Fluoro_3_S24.avi | 0.3213 | 0.1277 | 0.2651 |
| ann_Fluoro_3_S25.avi | 0.5718 | 0.1826 | 0.5162 |
| ann_Fluoro_3_S26.avi | 0.4523 | 0.1788 | 0.373 |
| ann_Fluoro_3_S27.avi | 0.4974 | 0.1785 | 0.4052 |
| ann_Fluoro_3_S29.avi | 0.4079 | 0.2097 | 0.4567 |
| ann_Fluoro_3_S31.avi | 0.5083 | 0.2594 | 0.746 |
| ann_Fluoro_3_S32.avi | 0.6885 | 0.2018 | 0.6194 |
| ann_Fluoro_3_S34.avi | 0.5107 | 0.2045 | 0.5085 |
| ann_Fluoro_3_S36.avi | 0.4705 | 0.1956 | 0.4199 |
| ann_march006.avi | 0.1823 | 0.1342 | 0.1429 |
| ann_march009.avi | 0.1541 | 0.1757 | 0.2335 |
| ann_march012.avi | 0.1477 | 0.1132 | 0.1886 |
| ann_march016.avi | 0.1836 | 0.1083 | 0.1255 |
| ann_march074.avi | 0.4089 | 0.2094 | 0.3988 |
| ann_march076.avi | 0.3329 | 0.1513 | 0.2835 |
| ann_march077.avi | 0.1702 | 0.1037 | 0.1616 |
| ann_march078.avi | 0.2519 | 0.1395 | 0.219 |
| ann_march187.avi | 0.1959 | 0.0999 | 0.1359 |
| ann_march189.avi | 0.1472 | 0.1193 | 0.1417 |
| ann_march191.avi | 0.3092 | 0.1221 | 0.1954 |
| ann_march192.avi | 0.393 | 0.1909 | 0.3313 |
| ann_march194.avi | 0.1323 | 0.1094 | 0.1475 |
| ann_march197.avi | 0.2598 | 0.1507 | 0.3029 |
| ann_march198.avi | 0.2901 | 0.2065 | 0.3417 |
| Average: | 0.3744 | 0.188 | 0.3793 |

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
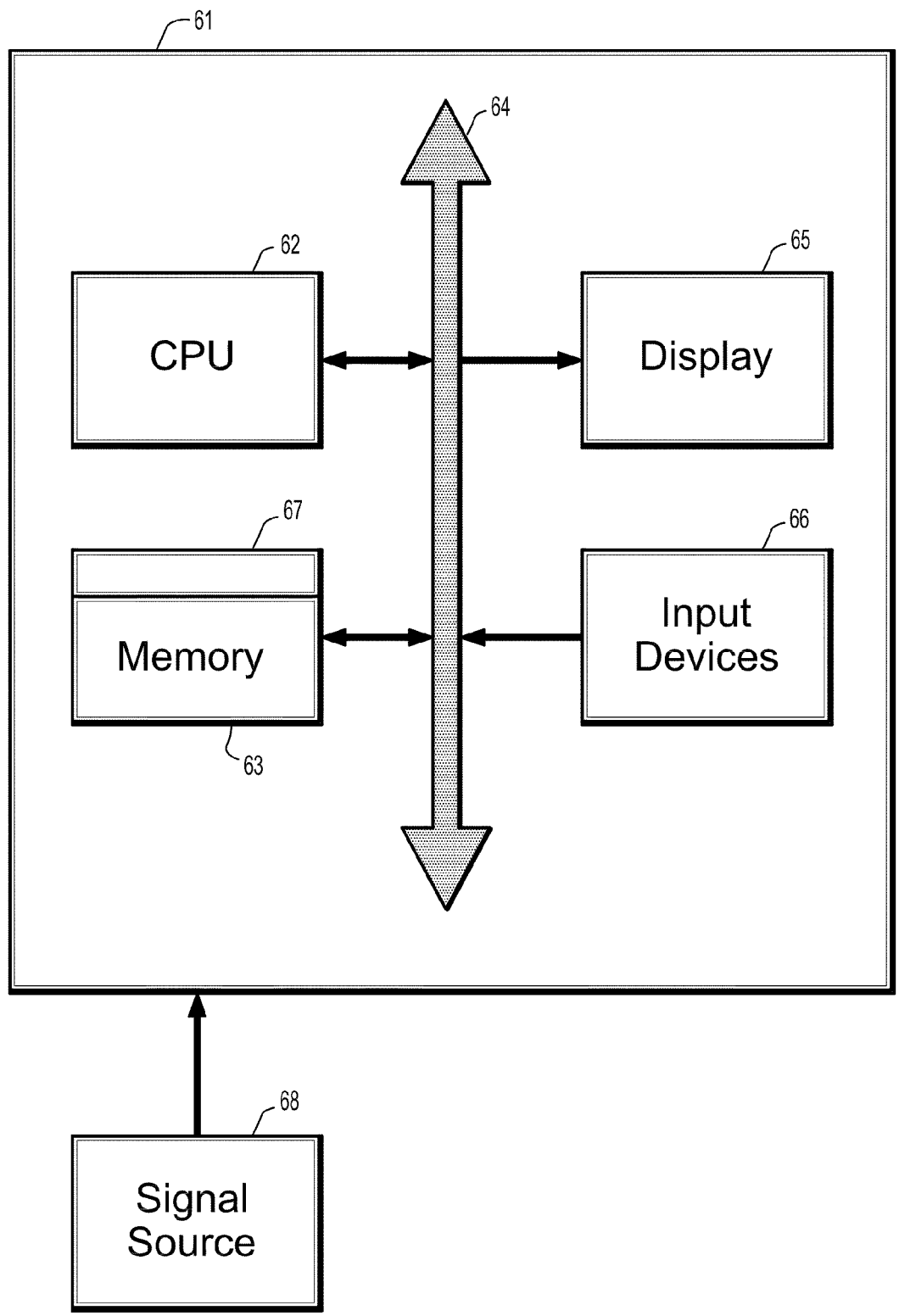
FIG. 6 is a block diagram of an exemplary computer system for implementing a method for detecting and tracking the guidewire in coronary angioplasty, according to an embodiment of the invention.

FIG. 6 is a block diagram of an exemplary computer system for implementing a method for detecting and tracking the guidewire in coronary angioplasty according to an embodiment of the invention. Referring now to FIG. 6, a computer system 61 for implementing the present invention can comprise, inter cilia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for downsampling fluoroscopic images and enhancing guidewire visibility during coronary angioplasty, said method comprising the steps of:
   providing a first digitized image comprising an array of intensities corresponding to a 2-dimensional grid of pixels;
   filtering said image with one or more steerable filters of different angular orientations;
   assigning a weight W and orientation O for each pixel based on a filter response for each pixel, wherein each pixel weight is assigned to a function of a maximum filter response magnitude and each pixel orientation is calculated from the angle producing a maximum filter response if said magnitude is greater than zero, wherein guidewire pixels have a higher weight than non-guidewire pixels; and
   downsampling orientation and weights to calculate a second image of half the resolution of said first digitized image, wherein said downsampling accounts for the orientation and higher weight assigned to said guidewire pixels.

2. The method of claim 1, wherein said first digitized image is acquired during a coronary angioplasty procedure.

3. The method of claim 1, wherein said pixel weight and orientation are assigned to zero if said maximum filter response is less than or equal to zero.

4. The method of claim 1, wherein said pixel orientation is assigned to a 2×2 tensor that is an outer product of a direction vector oriented normal to the angle producing said maximum filter response magnitude.

5. The method of claim 1, wherein downsampling said orientation and weights comprises calculating an average of the orientation of each pixel and the weight of each pixel over a neighborhood of pixels about each pixel to calculate a next level weight for said pixel, and calculating said second image from a subset of pixels in said first image by weighting said first image pixels by said next level weights.

6. The method of claim 5, wherein said neighborhood of pixels comprises a 3×3 neighborhood centered about each pixel weighted according to the matrix $$N = \begin{bmatrix} 0.0625 & 0.1250 & 0.0625 \\ 0.1250 & 0.2500 & 0.1250 \\ 0.0625 & 0.1250 & 0.0625 \end{bmatrix},$$

wherein said average orientation O' of pixel p is $$O'(p) = \frac{\sum_{i \in 3x3nbh(p)} W_i(p) N_i(p) O_i(p)}{\sum_{i \in 3x3nbh(p)} W_i(p) N_i(p)},$$

wherein the sum is over the 3×3 neighbor of pixel p.

7. The method of claim 6, wherein the average weight W' of pixel p is $$W'(p) = \frac{1}{9} \sum_{i \in 3x3nbh(p)} w_i,$$

wherein $$w_i(p) = N_i(p) + W_i(p) + |\hat{o}_i(p) \cdot \hat{o}'_i(p)|,$$

wherein ô is a unit orientation vector calculated from $O_i$ and ô' is a unit orientation vector calculated from $O'_i$.

8. The method of claim 7, wherein intensity of a pixel p in said second image I' is $$I'(p) = \frac{\sum_{i \in 3x3nbh(p)} w_i(p) \cdot I_i(p)}{\sum_{i \in 3x3nbh(p)} w_i(p)}$$

wherein the sum is over the 3×3 neighborhood from the first image I that corresponds to p.

9. The method of claim 1, further comprising:
selecting a set of pixels on said guidewire;
selecting a set of background pixels in a neighborhood of said guidewire that do not include the guidewire pixels;
calculating a mean intensity $\mu_N$, $\mu_B$, and intensity variance $\sigma_N$, $\sigma_B$ for both the guidewire pixels and the background pixels, respectively;
calculating s distance measure $d^2$ between said 2 sets of pixels as $$d^2(w) = \frac{1}{4}(\sigma_N - \sigma_B)^2 (\sigma_N + \sigma_B)^{-1} + \frac{1}{2} \log \frac{\frac{1}{2}(\sigma_N + \sigma_B)}{\sqrt{\sigma_N \sigma_B}},$$

wherein w represents the guidewire pixels; and
calculating a visibility V of said guidewire from $$V = \frac{1}{n} \sum_{i=1}^{n} d^2(w_i),$$

wherein the sum is over the guidewire pixels.

10. A method for downsampling fluoroscopic images and enhancing guidewire visibility during coronary angioplasty, said method comprising the steps of:
providing an first digitized image I comprising an array of intensities corresponding to a 2-dimensional grid of pixels, a pixel weight matrix W wherein guidewire pixels have a higher weight than non-guidewire pixels, and a pixel orientation tensor O that specifies an angular orientation for each guidewire pixel;
calculating a next level orientation tensor O' of a pixel p from a weighted average of pixel orientations over a 3×3 neighborhood of each pixel;
calculating a next level weight W' of pixel p by summing over a 3×3 neighborhood about each pixel a neighborhood weighting matrix, said pixel weight matrix W, and an absolute value of a dot product of between a unit vector of the pixel orientation tensor and a unit vector of a next level orientation; and
downsampling a second image I' from said first digitized image by averaging pixels of said first digitized image by said next level weights W' for a subset of pixel neighborhoods in said first image that correspond to pixels in said second image.

11. The method of claim 10, further comprising filtering said first image with one or more steerable filters of different angular orientations, wherein each said steerable filter is a linear combination of $2^{nd}$-derivative Gaussians.

12. The method of claim 11, wherein said pixel weight matrix W is assigned to a function of a maximum filter response magnitude and said pixel orientation tensor O is calculated from the angle producing said maximum filter response if said magnitude is greater than zero, otherwise if the maximum filter response magnitude is less than or equal to zero said pixel weight is assigned to zero and said orientation tensor is assigned to zero.

13. The method of claim 10, wherein said pixel orientation tensor is a 2×2 tensor that is an outer product of a direction vector oriented normal to said guidewire orientation.

14. The method of claim 10, wherein said 3×3 neighborhood weighting matrix is $$N = \begin{bmatrix} 0.0625 & 0.1250 & 0.0625 \\ 0.1250 & 0.2500 & 0.1250 \\ 0.0625 & 0.1250 & 0.0625 \end{bmatrix}.$$

15. The method of claim 10, further comprising calculating a visibility measure of said guidewire from said second image.

16. A non-transitory program storage device readable by a computer, tangibly embodying a program of instructions executable by the computer to perform the method steps for downsampling fluoroscopic images and enhancing guidewire visibility during coronary angioplasty, said method comprising the steps of:
providing a first digitized image comprising an array of intensities corresponding to a 2-dimensional grid of pixels;
filtering said image with one or more steerable filters of different angular orientations;

assigning a weight W and orientation O for each pixel based on a filter response for each pixel, wherein each pixel weight is assigned to a function of a maximum filter response magnitude and each pixel orientation is calculated from the angle producing a maximum filter response if said magnitude is greater than zero, wherein guidewire pixels have a higher weight than non-guidewire pixels; and downsampling orientation and weights to calculate a second image of half the resolution of said first digitized image, wherein said downsampling accounts for the orientation and higher weight assigned to said guidewire pixels.

17. The computer readable program storage device of claim 16, wherein said first digitized image is acquired during a coronary angioplasty procedure.

18. The computer readable program storage device of claim 16, wherein said pixel weight and orientation are assigned to zero if said maximum filter response is less than or equal to zero.

19. The computer readable program storage device of claim 16, wherein said pixel orientation is assigned to a 2×2 tensor that is an outer product of a direction vector oriented normal to the angle producing said maximum filter response magnitude.

20. The computer readable program storage device of claim 16, wherein downsampling said orientation and weights comprises calculating an average of the orientation of each pixel and the weight of each pixel over a neighborhood of pixels about each pixel to calculate a next level weight for said pixel, and calculating said second image from a subset of pixels in said first image by weighting said first image pixels by said next level weights.

21. The computer readable program storage device of claim 20, wherein said neighborhood of pixels comprises a 3×3 neighborhood centered about each pixel weighted according to the matrix $$N = \begin{bmatrix} 0.0625 & 0.1250 & 0.0625 \\ 0.1250 & 0.2500 & 0.1250 \\ 0.0625 & 0.1250 & 0.0625 \end{bmatrix},$$

wherein said average orientation O' of pixel p is $$O'(p) = \frac{\sum_{i \in 3 \times 3 nbh(p)} W_i(p) N_i(p) O_i(p)}{\sum_{i \in 3 \times 3 nbh(p)} W_i(p) N_i(p)},$$

wherein the sum is over the 3×3 neighbor of pixel p.

22. The computer readable program storage device of claim 21, wherein the average weight W' of pixel p is $$W'(p) = \frac{1}{9} \sum_{i \in 3 \times 3 nbh(p)} w_i,$$

wherein $$w_i(p) = N_i(p) + W_i(p) + |\hat{o}_i(p) \cdot \hat{o}'_i(p)|,$$

wherein $\hat{o}$ is a unit orientation vector calculated from $O_i$ and $\hat{o}'$ is a unit orientation vector calculated from $O'_i$.

23. The computer readable program storage device of claim 22, wherein intensity of a pixel p in said second image I' is $$I'(p) = \frac{\sum_{i \in 3 \times 3 nbh(p)} w_i(p) \cdot I_i(p)}{\sum_{i \in 3 \times 3 nbh(p)} w_i(p)}$$

wherein the sum is over the 3×3 neighborhood from the first image I that corresponds to p.

24. The computer readable program storage device of claim 16, the method further comprising:
    selecting a set of pixels on said guidewire;
    selecting a set of background pixels in a neighborhood of said guidewire that do not include the guidewire pixels;
    calculating a mean intensity $\mu_N$, $\mu_B$, and intensity variance $\sigma_N$, $\sigma_B$ for both the guidewire pixels and the background pixels, respectively;
    calculating s distance measure $d^2$ between said 2 sets of pixels as $$d^2(w) = \frac{1}{4}(\sigma_N - \sigma_B)^2(\sigma_N + \sigma_B)^{-1} + \frac{1}{2} \log \frac{\frac{1}{2}(\sigma_N + \sigma_B)}{\sqrt{\sigma_N \sigma_B}},$$

wherein w represents the guidewire pixels; and
    calculating a visibility V of said guidewire from $$V = \frac{1}{n} \sum_{i=1}^{n} d^2(w_i),$$

wherein the sum is over the guidewire pixels.

* * * * *